United States Patent
Sasa

(10) Patent No.: US 7,144,929 B2
(45) Date of Patent: *Dec. 5, 2006

(54) ACTIVE ENERGY RAY CURABLE INK-JET INK AND PRINTED MATERIAL USED THEREWITH

(75) Inventor: Nobumasa Sasa, Sayama (JP)

(73) Assignee: Konica Minolta Holdings, Inc., Tokyo (JP)

( * ) Notice: Subject to any disclaimer, the term of this patent is extended or adjusted under 35 U.S.C. 154(b) by 337 days.

This patent is subject to a terminal disclaimer.

(21) Appl. No.: 10/780,226

(22) Filed: Feb. 17, 2004

(65) Prior Publication Data

US 2004/0166253 A1    Aug. 26, 2004

(30) Foreign Application Priority Data

Feb. 25, 2003    (JP) .............................. 2003-047257

(51) Int. Cl.
*C08F 2/46* (2006.01)
*C07D 303/42* (2006.01)
*C07D 303/40* (2006.01)

(52) U.S. Cl. .................. 522/170; 522/168; 522/71; 522/81; 522/153; 522/104; 522/150; 522/167; 522/178; 522/181; 522/909; 428/413

(58) Field of Classification Search ............... 522/168, 522/170, 71, 80, 79, 153, 100, 103, 150, 522/167, 178, 181, 909; 428/413
See application file for complete search history.

(56) References Cited

U.S. PATENT DOCUMENTS

| | | | |
|---|---|---|---|
| 2,999,865 | A | 9/1961 | Phillips et al. |
| 3,147,236 | A | 9/1964 | Port et al. |
| 6,166,100 | A | 12/2000 | Hiwara et al. |

FOREIGN PATENT DOCUMENTS

| | | |
|---|---|---|
| GB | 2 396 620 A | 6/2004 |
| GB | 0403838.6 | 8/2004 |
| JP | 4-359075 | 11/1992 |
| JP | 8-143806 | 4/1996 |
| JP | 10-158581 | 6/1998 |

OTHER PUBLICATIONS

R. W. Bassemir et al. Kirk-Othmer Encyclopedia of Chemical Technology [online]. Copyright © 1995 by John Wiley & Sons, Inc. [retrieved on Mar. 15, 2005]. Retrieved from internet: <URL http://www.mrw.interscience.wiley.com/kirk/articles/inksbass.a01/sect2.html>. pp. 1-8. Article Online Posting Date: Dec. 4, 2000.*

* cited by examiner

*Primary Examiner*—Sanza L. McClendon
(74) *Attorney, Agent, or Firm*—Lucas & Mercanti, LLP

(57) ABSTRACT

An active energy ray curable ink-jet ink comprising an epoxy compound containing and alicyclic epoxy group and an epoxyfied fatty acid ester group, and a printed material used therewith.

8 Claims, No Drawings

ACTIVE ENERGY RAY CURABLE INK-JET INK AND PRINTED MATERIAL USED THEREWITH

TECHNICAL FIELD

The present invention relates to an active energy ray curable ink-jet ink and a printed material using the same.

BACKGROUND

Up to now, as an ink-jet ink exhibiting good water resistance, there has been an ink which contains a water soluble dye dispersed or dissolved in a high boiling point solvent, and which contains a water soluble dye dissolved in a volatile solvent. However, a dye is inferior to a pigment in resistance characteristics such as light stability, and therefore ink using a pigment as a coloring agent has been required. But, it is difficult to disperse a pigment stably in an organic solvent, and it is also difficult to ensure stable dispersibility and ejectibility. On the other hand, in cases when ink using a high boiling solvent is applied onto a nonabsorbable base material, a solvent in the ink is not volatized, results in difficulty of drying via evaporation of the solvent. Accordingly, ink using high boiling solvent cannot be printed onto nonabsorbable base materials.

Generally, ink using a volatile organic solvent can be preferably printed onto a nonabsorbable base material due to adhesiveness of the used resin and volatilization of the solvent. However, since a volatile solvent is a major component, drying of the solvent by volatilization is almost instantaneous at the nozzle surface of the head, resulting in necessity of frequent maintenance. Resistance characteristics of the printing material to some solvents may not be sufficient because the ink essentially requires resolubility in a solvent.

Further, for an on-demand printer using a piezo element, usage of excessive volatile solvent increases frequency of maintenance, and also tends to induce problems such as dissolution and swelling of ink contacting materials in the printer. In addition, a volatile solvent has numerous restrictions as a dangerous material under the Fire Defense Law. Consequently, in an on-demand printer using a piezo element, it is desired to employ ink containing less volatile solvent.

What has recently attracted wide spread attention is active energy ray curable ink. Active energy ray curable ink solves the problem of volatility of a solvent, and further, can be used with solvent nonabsorbable base materials. However, components used for active energy ray curable ink usually exhibit relatively high viscosity. Therefore, it is difficult to design ink having good curability and high stability in the viscosity enabling ejection by conventional printers.

To overcome these problems, disclosed is an active energy ray curable composition containing an oxetane ring containing compound, an epoxy compound or a vinyl ether compound (refer to Patent Documents 1, 2 and 3).

However, as a result of study of the epoxy compounds described in the above documents, it was proven that curability and cured layer strength of the active energy ray curable composition are relatively good under low humidity conditions, but those under high humidity conditions are problematic, and additionally ejection stability at the nozzle, adhesiveness to base materials, resistance to solvents, and resistance to water are also problematic.

Patent Document 1 JP-A 2000-1482 (term of JP-A refers to as unexamined Japanese Patent Application Publication)

Patent Document 2 JP-A H8-143806

Patent Document 3 JP-A H7-53711

SUMMARY OF THE INVENTION

The object of the present invention is to provide active energy ray curable ink-jet ink which is superior in photo polimerizability and curability specifically under high humidity conditions, and further an ink which exhibits good ink stability, high strength of the cured layer, superior ejecting stability at nozzles, good contact adhesion property to the base material, and superior resistance to solvents and water in cases when an oxetane ring containing compound is employed and to provide a printed material used therewith.

The above object of the present invention is achieved by the following.

(1) An active energy ray curable ink-jet ink comprising an epoxy compound containing an alicyclic epoxy group and an epoxyfied fatty acid ester group.

(2) The active energy ray curable ink-jet ink according to Item (1) above, wherein the epoxy compound is represented by Formula (1).

Formula (1)

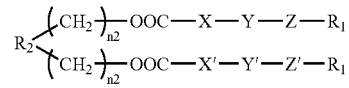

wherein $R_1$ is an alkyl group having 1 to 10 carbon atoms, $R_2$ is a divalent linkage group having an alicyclic epoxy group, X, Y and Z are independently selected from the group consisting of $-(CH_2-)_{n1}$, $-(CH_2-CH=CH-)_{m2}$ and

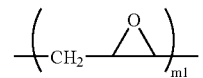

provided that X, Y and Z are each different, X', Y' and Z' are independently selected from the group consisting of $-(CH_2-)_{n1}$, $-(CH_2-CH=CH-)_{m2}$ and

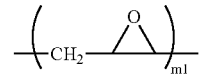

provided that X', Y' and Z' are each different, n1 is an integer from 1 to 20, n2 is an integer from 0 to 10, m1 is an integer from 1 to 10, m2 is an integer from 0 to 10, the sum of (m1+m2) is from 1 to 20.

(3) The active energy ray curable ink-jet ink according to Item (1) or (2) above, wherein the ink further comprises at least an oxetane ring containing compound or vinyl ether compound.

(4) The active energy ray curable ink-jet ink according to any one of Items (1) to (3) above, wherein the ink further comprises a cationic photo polymerization initiator.

(5) The active energy ray curable ink-jet ink according to any one of Items (1) to (4), wherein the ink further comprises a pigment.

(6) The active energy ray curable ink-jet ink according to Item (5) above, wherein the ink further comprises a pigment dispersing agent.

(7) The active energy ray curable ink-jet ink according to either Item (5) or (6), wherein the average particle diameter of the pigment is 10 to 150 nm.

(8) The active energy ray curable ink-jet ink according to any one of Items (1) to (7), wherein viscosity at 25° C. of the active energy ray curable ink is 5 to 50 mPa·s.

(9) A printed material formed by using the active energy ray curable ink-jet ink according to any one of Items (1) to (8) on a base material.

PREFERRED EMBODIMENTS

The present invention will now be further detailed. The present invention relates to an active energy ray curable ink-jet ink characterized by containing a specific structured epoxy compound. Further, the present invention preferably further contains an oxetane ring containing compound, a vinyl ether compound, a cationic photo polymerization initiator, a pigment and a pigment dispersing agent, and still further, the pigment is preferably a fine particle pigment having an average particle diameter of 10–150 nm. Yet further, in this invention, viscosity at 25° C. is preferably 5–50 mPa·s. Also, the present invention relates to a printed material employing the above mentioned active energy ray curable ink-jet ink onto a base material.

As a pigment contained in ink-jet ink of this invention, usable are inorganic achromatic color pigments or organic chromatic color pigments such as carbon black, titanium oxide and potassium carbonate. Examples of organic pigments include insoluble azo pigments such as Toluidine Red, Toluidine Maroon, Hanza Yellow, Benzidine Yellow, and Pyrazolone Red; soluble azo pigments such as Lithol Red, Helio Bordeaux, Pigment Scarlet, and Permanent Red 2B; derivatives derived from vat dyes such as Alizarine, indanthrone, and Thioindigo maroon; phthalocyanine based organic pigments such as Phthalocyanine Blue and Phthalocyanine Green; quinacridone based organic pigments such as Quinacridone Red and Quinacridone Magenta; perylene based organic pigments such as Perylene Red and Perylene Scarlet; isoindolinone based organic pigments such as Isoindolinone Yellow and Isoindolinone Orange; pyranthrone based organic pigments such as Pyranthrone Red and Pyranthrone Orange; thioindigo based pigments; condensed azo based organic pigments; benzimidazolone based organic pigments; quinophtharone based organic pigments such as Quinophthalone Yellow; isoindolin based organic pigments such as Isoindolin Yellow; and other pigments such as flavanthrone yellow, acylamide yellow, nickel azo yellow, copper azomethine yellow, perynone orange, anthrone orange, dianthraquinonyl red, and dioxazine violet.

Examples of organic pigments, when designated using the Color Index (C.I.) number, include C.I. Pigment Yellow 12, 13, 14, 17, 20, 24, 74, 83, 86, 93, 109, 110, 117, 125, 128, 129, 137, 138, 139, 147, 148, 150, 151, 153, 154, 155, 166, 168, 180, and 185; C.I. Pigment Orange 16, 36, 43, 51, 55, 59, and 61; C.I. Pigment Red 9, 48, 49, 52, 53, 57, 97, 122, 123, 149, 168, 177, 180, 192, 202, 206, 215, 216, 217, 220, 223, 224, 226, 227, 228, 238, and 240; C.I. Pigment Violet 19, 23, 29, 30, 37, 40, and 50; C.I. Pigment Blue 15, 15:1, 15:3, 15:4, 15:6, 22, 60, and 64; C.I. Pigment Green 7 and 36; and C.I. Pigment Brown 23, 25, and 26.

Of the foregoing pigments, due to excellent light stability, preferred are quinacridone based organic pigments, phthalocyanine based organic pigments, benzimidazolone based organic pigments, isoindolinone based organic pigments, condensed azo based organic pigments, quinophthalone based organic pigments, and isoindolin based organic pigments. The foregoing organic pigments are preferably comprised of minute pigment particles of an average diameter of 10–150 nm, which is determined utilizing laser scattering. When the average particle diameter of pigments is less than 10 nm, the resulting light stability is degraded due to the excessively small particle diameter. On the other hand, when it exceeds 150 nm, the stability of the resulting dispersion is lowered whereby the pigments tend to precipitate.

It is possible to prepare minute-sized organic pigments, employing the method described below. Namely, a clayey mixture, consisting of at least three components of an organic pigment, a water-soluble inorganic salt in a factor of at least 3 by weight of the organic pigment, and a water soluble solvent, is sufficiently kneaded to result in minute particles, employing a kneader and the like. Thereafter, the resulting mixture is immersed in water and stirred employing a high speed mixer to form a slurry. The resulting slurry is repeatedly filtered and washed with water, whereby water soluble salts as well as water soluble solvents are removed. During the minute particle production process, added may be resins and pigment dispersing agents. Listed as water soluble inorganic salts are sodium chloride and potassium chloride. The weight of the employed salts is preferably in the range of 3–20 times the weight of the organic pigment. When the weight of the foregoing inorganic salts is less than or equal to 3 times the organic pigment, it is impossible to prepare pigments of the desired particle size. On the other hand, when the weight is more than or equal to 20 times the organic pigment, a major washing process is required as a post-process, whereby the processed amount of the organic pigments is substantially decreased.

The foregoing water soluble solvents are employed so that the resulting mixture of pigments and water soluble inorganic salts used as a crushing aid forms a suitable clayey state to result in efficient crushing. The water soluble solvents are not specifically limited as long as they are water soluble. However, during kneading, temperature increases, resulting in a state in which solvents tend to vaporize. As a result, from the viewpoint of safety, preferred are solvents having a high boiling point of 120–250° C. Listed as such water-soluble solvents are 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, and low molecular weight polypropylene glycol.

In the present invention, in order to obtain sufficient density and desired light stability, the foregoing pigments are incorporated in the ink-jet ink in a range of 3–15% by weight.

The epoxy compound of this invention is not specifically limited as long as it contains an alicyclic epoxy group and an epoxidized fatty acid ester group, and is preferably a compound represented by foregoing Formula (1).

The term "an alicyclic epoxy group" used here is a group derived from the following formula. The dashed line represents an alicyclic ring.

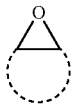

Formula

Examples of preferred alicyclic epoxy groups are as follows, but not limited to them.

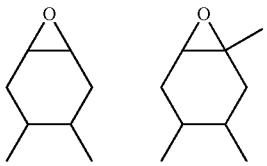

A compound represented by Formula (1) may be produced by reacting an unsaturated fatty acid or its derivative with a divalent alcohol which contains an alicyclic structured group and at least one double bond in its ring structure, after which it is epoxidized in an oxidation reaction.

As epoxy compounds represented by other than forgoing Formula (1), employed may be ones which contain only one substituent group of the alicyclic epoxy ring of the foregoing epoxy compounds.

Exemplified compounds are illustrated below.

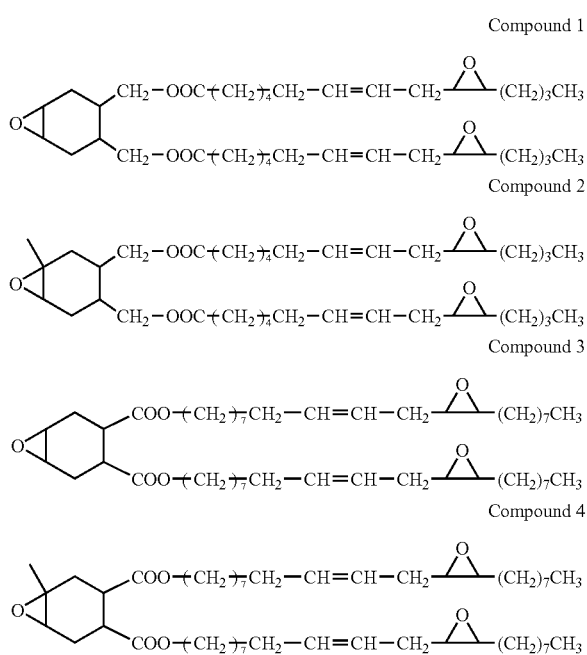

In the active energy ray curable ink-jet ink of this invention, it is preferred to employ an oxetane compound at the same time. An oxetane compound is a compound containing one or more oxetane rings in the molecule. Specifically preferably employed are 3-ethyl-3-hydroxymethyl oxetane (such as OXT101, a trade name of Toagosei Co., Ltd.), 1,4-bis[(3-etyl-3-oxetanyl) methoxymethyl]benzene (such as OXT121, also a trade name of Toagosei Co., Ltd.), 3-ethyl-3-(phenoxymethyl)oxetane (such as OXT211, another trade name of Toagosei Co., Ltd.), di(1-ethyl-3-oxetanyl)methylether (such as OXT221, still another trade name of Toagosei Co. Ltd.) and 3-ethyl-3-(2-ethylhexyloxymethyl)oxetane (such as OXT212, one more trade name of Toagosei Co., Ltd.), and specifically preferably utilized are 3-etyl-3-hydroxymethl oxetane, 3-ethyl-3-(phenoxymethyl)oxetane and di(1-ethyl-3-oxetanyl)methyl ether. These can be employed alone or in combinations of two or more kinds.

In the active energy ray curable ink-jet ink of this invention, an oxirane group containing compound other than an epoxy compound of this invention may be employed together. Oxirane group containing compounds are those having, in the molecule, at least one oxirane ring represented by the formula described below.

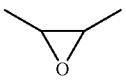

It is possible to use any monomers, oligomers, or polymers which are customarily employed as an epoxy resin. Specifically listed are conventional aromatic epoxides, alicyclic epoxides, and aliphatic epoxides known in the art. Further, epoxides, as described herein, refer to monomers or oligomers. These compounds may be employed individually or if desired in combinations of at least two types.

Preferred aromatic epoxides include di- or polyglycidyl ethers which are prepared by allowing polyhydric phenol having at least one aromatic nucleus or alkylene oxide addition products thereof to react with epichlorohydrin. Examples include di- or polyglycidyl ethers of bisphenol A or alkylene oxide addition products thereof, di- or polyglycidyl ethers of hydrogenated bisphenol A or alkylene oxide addition products thereof, and novolak type epoxy resins. Herein, listed as alkylene oxides are ethylene oxide and propylene oxide.

Preferred as alicyclic epoxides are compounds comprising cyclohexene oxide or cyclopentane oxide, which are prepared by epoxyfying compounds having at least one cycloalkane ring such as a cyclohexene or cyclopentene ring, employing suitable oxidizing agents such as hydrogen peroxide or peracids.

Listed as examples are;

Celloxide 2021, Celloxide 2021A, Celloxide 2021P, Celloxide 2080, Celloxide 3000, Celloxide 2000, Epolead GT 301, Epolead GT 302 Epolead GT 401, Epolead GT 403, EHPE-3150, EHPEL 3150CE (produced by Daicel Chemical Industries, Ltd.);

UVR-6105, UVR-6110, UVR-6128, UVR-6100, UVR-6216, UVR-6000 (produced by Union Carbide Co.).

Preferred aliphatic epoxides include di- or polyglycidyl ethers of aliphatic polyhydric alcohols or alkylene oxide addition products thereof. Representative examples include diglycidyl ethers of alkylene glycol such as diglycidyl ether of ethylene glycol, diglycidyl ether of propylene glycol, or diglycidyl ether of 1,6-hexanediol; polyglycidyl ethers of polyhydric alcohols such as di- or triglycidyl ethers of glycerin or alkylene oxide addition products thereof; and diglycidyl ethers of polyalkylene glycol such as diglycidyl ethers of polyethylene glycol or alkylene oxide addition products thereof, and diglycidyl ethers of polypropylene glycol or alkylene oxide addition products thereof. Herein, listed as alkylene oxides are ethylene oxide and propylene oxide.

Further, in addition to these compounds, usable are monoglycidyl ethers of aliphatic higher alcohols, and monoglysidyl ethers of phenol or cresol. Of these epoxides, from the viewpoint of faster curability, preferred are aromatic epoxides and alicyclic epoxides, of which particularly preferred are alicyclic epoxides.

A compound having an oxirane group in its molecule is included in a liquid composition comprising a compound having an epoxy compound, an oxetane ring containing compound (and if required, admixing of a vinyl ether compound) of this invention, in an amount of 10–50 weight %, and more preferably, 30–50 weight %.

It is preferred that a vinyl ether compound is contained in the active energy ray curable ink-jet ink of this invention. As examples of vinyl ether compounds, listed are di- or trivinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether.

Of these vinyl ether compounds, when taking into account curability, adhesion properties, and surface hardness, di- or trivinyl ether compounds are preferred, and divinyl ether compounds are specifically preferred. In the present invention, the foregoing vinyl ether compounds may be employed individually or in combinations of at least two types.

The foregoing vinyl ether compounds are employed as an optional blending component. However, through their incorporation, it is possible to decrease the viscosity of the ink-jet ink to the desired level. Further, it is possible to enhance the curing rate. The vinyl ether compounds are incorporated into the liquid component comprised of oxirane group containing compounds and oxetane ring containing compounds in an amount of 0–40 weight %, and preferably 0–20 weight %.

Listed as cationic photo polymerization initiators used in this invention are arylsulfonium salt derivatives (e.g., Cyracure UVI-6990 and Cyracure UVI-6974, produced by Union Carbide Co., and Adeka Optomer SP-150, Adeka Optomer SP-152, Adeka Optomer SP-170, and Adeka Optomer SP-172, produced by Asahi Denka Co., Ltd.), allyliodonium salt derivatives (e.g., RP-2074, produced by Rohdia Co.), allene-ion complex derivatives (e.g., Irugacure 261, produced by Ciba-Geigy Limited), diazonium salt derivatives, triazine based initiators, and other initiators such as acid generating agents such as halides. The foregoing cationic photo polymerization initiators are preferably incorporated in an amount of 0.2–20 parts by weight with respect to 100 parts by weight of the compound having an alicyclic epoxy group. When the amount of the cationic photo polymerization initiators is less than 0.2 parts by weight, it is difficult to prepare cured materials. On the other hand, the incorporation in an amount exceeding 20 parts by weight results in no curability enhancing effects. These cationic photo polymerization initiators may be employed individually or in combinations of at least two selected types.

Listed as photo polymerization promoters are anthracene and anthracene derivatives (e.g., Adeka Optomer SP-100, produced by Asahi Denka Co., Ltd.). These photo polymerization promoters may be employed individually or in combinations of a plurality of types.

Listed as pigment dispersing agents may be carboxylic acid esters containing a hydroxyl group, salts of long chain polyaminoamides with high molecular weight acid esters, high molecular weight polycarboxylic acid salts, salts of long chain polyaminoamides with polar acid esters, high molecular weight unsaturated acid esters, high molecular copolymers, modified polyurethanes, modified polyacrylates, polyether ester type anion based surface activating agents, naphthalenesulfonic acid formalin condensation product salts, aromatic sulfonic acid formalin condensation product salts, polyoxyethylene alkylphosphoric acid esters, polyoxyethylene nonylphenyl ether, stearylamine acetate, and pigment derivatives.

Specific examples of pigment dispersing agents include "Anti-Terra-U (a polyaminoamide phosphoric acid salt)", "Anti-Terra-203/204 (a high molecular weight epoxycarboxylic acid salt)", "Disperbyk-101 (an ester of polyaminoamide phosphoric acid salt and acid), -107 (a hydroxyl group containing carboxylic acid ester), -110 (an acid group containing copolymer), -130 (a polyamide), -161, -162, -163, -164, -165, -166, and -170 (a high molecular copolymer)", 400", "Bykumen" (a high molecular weight unsaturated acid ester), "BYK-P104, P105 (a high molecular weight unsaturated polycarboxylic acid)", "P104S, 240S (a high molecular weight unsaturated acid polycarboxylic acid and silicon based), and "Lactimon (a long chain amine, unsaturated acid polycarboxylic acid, and silicone)", all produced by BYK Chemie GmbH.

Further, listed are "Efka-44, -46, -47, -48, -49, -54, -63, -64, -65, -66, -71, -701, -764, and -766", "Efka Polymer-100 (a modified polyacrylate), -150 (an aliphatic modified polymer), -400, -401, -402, -403, -450, -451, -452, and -453 (modified polyacrylates), 745 (being a copper phthalocyanine based polymer)", all produced by Efka Chemicals F. V., and "Flowlen TG-710 (a urethane oligomer)", "Flownon SH-290, SP-1000", "Polyflow No. 50E, and No. 300 (an acryl based copolymer)", all produced by Kyoei Chemical Co., Ltd., "Disparlon KS-860, -873SN, and -874 (polymer dispersing agents), #2150 (an aliphatic poly-valent carboxylic acid), and #7004 (a polyether ester type dispersing agent)", all produced by Kusumoto Chemicals, Ltd.

Further, listed are Demol RN and N (both being naphthelenesulfonic acid formalin condensation product sodium salts), MS, C, and SN-B (all are aromatic sulfonic acid formalin condensation product sodium salts), and EP, Homogenol L-18 (a polycarboxylic acid type polymer), Emulgen 920, 930, 931, 935, 950, and 985 (all are polyoxyethylene nonyl phenyl ethers)", and Acetamin 24 (a coconut amine acetate) and 86 (a stearylamine acetate), all produced by Kao Corp.; Solsperse 5000 (a phthalocyanine ammonium salt based dispersing agent), 13240 and 13940 (both being polyesteramine based dispersing agents), 17000 (being a fatty acid amine based dispersing agent), 24000, and 2000, all produced by Zeneca Limited.; and Nikkol TO 106 (a polyoxyethylene sorbitan monooleate), MYS-IEX (a polyoxyethylene monostearate), and Hexagline 4O (a hexaglyceryl tetraoleate), all produced by Nikko Chemicals Co., Ltd.

The foregoing pigment dispersing agents in the ink are preferably incorporated in an amount ranging from 0.1–10 weight %.

The active energy ray curable ink-jet inks of the present invention are produced by dispersing pigments together with active energy ray curable compounds and pigment dispersing agents, employing common homogenizers such as a sand mill. It is preferable that a concentrated liquid pigment composition at a high concentration, which has been prepared in advance, is diluted by active energy ray curable compounds. It is possible to achieve sufficient dispersion even though dispersion is carried out employing common homogenizers. Therefore, excessive dispersion energy as well as excessive dispersion time is not required. As a result, ink components do not change during dispersion, whereby it is possible to prepare an ink which exhibits excellent stability. The ink is preferably filtered employing at most a 3 μm pore filter and more preferably 1 μm or less.

The viscosity of the ink-jet ink of the present invention is preferably adjusted to a relatively high 5–50 mPa·s at 25° C. Ink at a viscosity of 5–50 mPa·s at 25° C. exhibits consistent ejection characteristics when ejected from a head operating at a common frequency of 4–10 KHz as well as from a head having a higher frequency of 10–50 KHz. In cases when the foregoing viscosity of the high frequency head is less than 5 mPa·s, ejection response properties are noticeably degraded. On the other hand, when it exceeds 50 mPa·s, even though a viscosity decreasing mechanism employing heating is installed in the head, ejection itself is lowered, and in addition ejection stability is lost, making stable ejection impossible.

Further, when a piezo head is used, the conductivity of the active energy ray curable ink-jet ink of the present invention is preferably adjusted to a maximum of 10 μS/cm to minimize electrolytic corrosion in the interior of the head. Further, in continuous type printing, it is necessary to adjust conductivity by the use of electrolytes, and in such cases, it is necessary to adjust the conductivity to at least 0.5 mS/cm.

Base materials employed in the present invention include all the conventional synthetic resins which are widely employed for various uses. Specific examples include polyester, polyvinyl chloride, polyethylene, polyurethane, polypropylene, acrylic resins, polycarbonate, polystyrene, acrylonitrile-butadiene-styrene copolymers, polyethylene terephthalate, and polybutadiene terephthalate. The thickness and shape of these synthetic resinous base materials are not specifically limited.

The active energy ray curable ink-jet ink of the present invention is used as follows. Initially, the foregoing ink-jet ink is supplied to the printer head of a printer for the ink-jet recording system and is ejected onto a base material from the foregoing printer head. Thereafter, it is exposed to active energy rays such as ultraviolet radiation or electron beams. Following such radiation, the ink composition on a printing medium undergoes rapid curing.

Incidentally, when ultraviolet radiation is used, employed as active energy ray light sources may be, for example, mercury arc lamps, xenon arc lamps, fluorescent lamps, carbon arc lamps, tungsten-halogen copying lamps, and sun light. When curing is carried our employing electron beams, commonly used as beams are those at a maximum energy of 300 eV. However, it is possible to carry out almost instantaneous curing at an exposure amount of 1–5 Mrad.

EXAMPLES

The present invention will now be described based on examples. However, the present invention is not limited thereto.

Preparation of Present Invention Inks 1–4

The pigment, dispersing agent, oxirane group containing compounds, oxetane ring containing compound, and vinyl ether compound, shown in Table 1, were all charged into a sand mill and dispersed for 4 hours, whereby an active energy ray curable ink consentrate solutions were prepared. Subsequently, an initiator was added to the foregoing consentrate solutions, and slowly mixed until the foregoing initiator was dissolved. Thereafter, the resulting mixtures were filtered under pressure employing membrane filters, whereby active energy ray curable ink-jet inks were prepared. The resulting ink was loaded into an ink-jet printer, having a piezo head, and printing was performed onto polyethylene terephthalate base material. Subsequently, curing was carried out at a base material conveyance rate of 500 mm/second, employing a UV exposure apparatus (8 cold cathode ray tubes: 20 W output) under the environmental conditions (temperature and humidity) described in Table 2.

TABLE 1

| Inks of this invention | | 1 | 2 | 3 | 4 |
|---|---|---|---|---|---|
| Pigment | P1 | 5 | 5 | 5 | 5 |
| Oxyrane group containing compound | Exemplified Compound 1 | 20 | — | — | — |
| | Exemplified Compound 2 | — | 30 | — | — |
| | Exemplified Compound 3 | — | — | 30 | — |
| | Exemplified Compound 4 | — | — | — | 20 |
| Oxetane ring containing compound | OXT221 | 70 | 70 | 70 | 80 |
| Vinyl ether compound | DVE-3 | 10 | — | — | — |
| Pigment dispersing agent | 32000 | 3 | 3 | 3 | 3 |
| Initiator | SP-152 | 10 | 10 | 10 | 10 |

Compounds in Table 1 are described below. The numerical figure represents parts by weight.

Pigment

P1: 250 parts of crude copper phthalocyanine ("Copper Phthalocyanine", produced by Toyo Ink Mfg. Co., Ltd.), 2,500 parts of sodium chloride, and 160 parts of polyethylene glycol ("Polyethylene Glycol 300", produced by Tokyo Kasei Co.), were charged into a 1-gallon stainless kneader (manufactured by Inoue Mfg. Co., Ltd.) and kneaded for 3 hours. Subsequently, the resulting mixture was charged into 2.5 L of heated water, and the resulting mixture was stirred for approximately one hour while heated to approximately 80° C. to form a slurry. Thereafter, the resulting slurry was filtered, washed 5 times with water to remove sodium chloride and solvents, and spray-dried, whereby a dried processing pigment was prepared.

Oxetane ring containing compound

OXT 221: oxetane compound (produced by Toagosei Co. Ltd.)

Vinyl ether compound

DVE-3: triethylene glycol divinyl ether (produced by International Specialty Products)

Pigment dispersing agent
  32000: modified aliphatic dispersing agent ("Solsperse 32000", produced by Zeneca Limited)
Initiator
  SP-152: triphenylsulfonium salt ("Adeka Optomer SP-152", produced by Asahi Denka Co., Ltd.)

Preparation of Comparative Ink 1

Comparative Ink 1 was prepared in the same manner as Example 1 except that the epoxy compound of the present invention was replaced with Celloxide 2021P (alicyclic epoxy, produced by Daicel Chemical Industries, Ltd.).

Inks 1–4 of the present invention, Comparative Ink 1 and the printed materials used therewith were evaluated on the following criteria. The results are shown in Table 2.

Evaluation methods for items described in Table 3 are as follows.

Curability: The number of passes of the conveyor UV lamp until no tackiness was felt manually.

Stability (of Ink): After storing the ink at 25° C. for one month, its dispersion state was visually evaluated, and also, any viscosity change was noted for evaluation.
  A: no precipitation was observed, nor a change in viscosity
  B: no precipitation was observed, however viscosity increased longitudinal and lateral lines at an interval of 1 mm in accordance with JIS K 5400 to form 100 1 mm$^2$ squares. Thereafter, Cellotape (a registered trade mark) was adhered to the cross-cut surface. Subsequently, the Cellotape® was rapidly pulled at an angle of 90 degrees and any remaining printed images, those not peeled off, or the state of the cross-cut surface were evaluated based on the criteria below. The image printed surface which was not subjected to the foregoing cross-cut was also evaluated in the same manner. Samples cured at 25° C. and 45% RH were evaluated.
  A: Employing the cross-cut test method, no printed images were peeled off
  B: In the cross-cut test, printed images were slightly peeled away, while where the image surface was not cut, almost no peeling was noticed
  C: Under both conditions, the image surface was easily peeled employing Cellotape (a registered trade mark)

Solvent Resistance and Water Resistance: A sample of printed images on a film was immersed in alcohol or warm water at 50° C. for 10 seconds, and image and the degree of contraction were visually evaluated based on the criteria below.
  A: No changes were noticed
  B: Slight damage and contraction were noticed
  C: Marked damage and contraction were noticed

TABLE 2

| Ink composition | Curability 25° C. 45% RH | Curability 25° C. 85% RH | Curability 35° C. 85% RH | Stability Ink | Stability Ejection | Layer Strength | Contact adhesion property | Solvent Resistance | Water Resistance |
|---|---|---|---|---|---|---|---|---|---|
| Present invention 1 | 1 | 1 | 1 | A | A | A | A | A | A |
| Present invention 2 | 1 | 1 | 1 | A | A | A | A | A | A |
| Present invention 3 | 1 | 1 | 1 | A | A | A | A | A | A |
| Present invention 4 | 1 | 1 | 1 | A | A | A | A | A | A |
| Comparative 1 | 2 | >20 | 4 | C | C | C | C | B | B |

C: precipitation was observed

Stability (ejection): After continuous ink ejection for 30 minutes, the presence and absence of nozzle clogging was observed and continuous ejectability was evaluated based on the criteria below.
  A: During 30-minute continuous ejection, all nozzles performed normal ejection (no nozzle clogging)
  B: During 30-minute continuous ejection, all nozzles performed normal ejection (no nozzle clogging), but satellites resulted
  C: During 30-minute continuous ejection, some nozzles performed unacceptable ejection (nozzle clogging)

Layer Strength: The strength of the cured layer was evaluated employing a finger nail scratch test. Samples cured at 25° C. and 45% RH were used.
  A: The layer was not removed at all by scratching
  B: Some portions of the layer were removed somewhat by scratching
  C: The layer was easily damaged or removed by scratching Contact Adhesion Property: The image printed surface, prepared as above, was subjected to cross-cutting of 11

As is apparent from Table 2, it was proved that the present invention exhibited superiority in curability, ejection stability at nozzles, layer strength, contact adhesion property of printed images, and solvent resistance and water resistance of printed images compared to the comparative sample.

According to the present invention, it is possible to obtain excellent print quality even under high humidity conditions using an active energy ray curable ink-jet ink containing the specific structured epoxy compound of the present invention.

What is claimed is:

1. An active energy ray curable ink-jet ink comprising an epoxy compound containing an alicyclic epoxy group and an epoxified fatty acid ester group, wherein the epoxy compound is represented by following Formula (1):

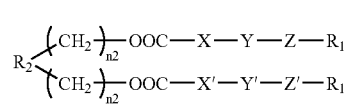

Formula (1)

wherein $R_1$ is an alkyl group having 1 to 10 carbon atoms, $R_2$ is a divalent linkage group having an alicyclic epoxy group, X, Y and Z are independently selected from the group consisting of

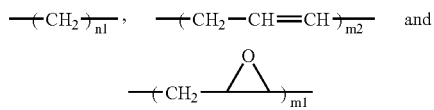

provided that X, Y and Z are each different,

X', Y' and Z' are independently selected from the group consisting of

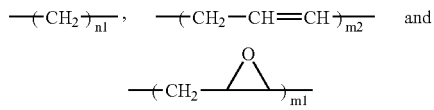

provided that X', Y' and Z' are each different, n1 is an integer from 1 to 20,
n2 is an integer from 0 to 10,
m1 is an integer from 1 to 10,
m2 is an integer from 0 to 10,
the sum of (m1+m2) is from 1 to 20.

2. The active energy ray curable ink-jet ink according to claim 1, wherein the ink further comprises at least one of an oxetane ring containing compound and a vinyl ether compound.

3. The active energy ray curable ink-jet ink according to claim 1, wherein the ink further comprises a cationic photo polymerization initiator.

4. The active energy ray curable ink-jet ink according to claim 1, wherein the ink further comprises a pigment.

5. The active energy ray curable ink-jet ink according to claim 4, wherein the ink further comprises a pigment dispersing agent.

6. The active energy ray curable ink-jet ink according to claim 4, wherein an average particle diameter of the pigment is 10 to 150 nm.

7. The active energy ray curable ink-jet ink according to claim 1, wherein a viscosity at 25° C. of the active energy ray curable ink is 5 to 50 mPa·s.

8. A printed material formed by using the active energy ray curable ink-jet ink according to claim 1 on a base material.

* * * * *